United States Patent [19]
Takahashi et al.

[11] Patent Number: 6,002,220
[45] Date of Patent: Dec. 14, 1999

[54] ELECTRIC POWER STORAGE AIR-CONDITIONING SYSTEM

[75] Inventors: Tadashi Takahashi, Hitachi; Satoru Funaki, Yokohama; Katsunori Nishimura, Hitachiota; Hidetoshi Honbo, Hitachi; Noriaki Arakawa, Ohira-machi, all of Japan

[73] Assignee: Hitachi, Ltd., Tokyo, Japan

[21] Appl. No.: 08/912,832

[22] Filed: Aug. 19, 1997

[30] Foreign Application Priority Data

Aug. 22, 1996 [JP] Japan ................................. 8-220989

[51] Int. Cl.⁶ ........................................ H02P 1/00
[52] U.S. Cl. ..................... 318/139; 318/25.4; 363/146
[58] Field of Search ................................. 318/139, 353, 318/362; 363/132, 146, 17, 21; 307/43–87, 66, 45; 324/16 R; 607/5; 320/132, 163

[56] References Cited

U.S. PATENT DOCUMENTS

| | | |
|---|---|---|
| 4,348,619 | 9/1982 | Ray et al. ................................. 318/139 |
| 5,140,509 | 8/1992 | Murugan ..................................... 363/17 |
| 5,297,015 | 3/1994 | Miyazaki et al. ......................... 363/146 |

*Primary Examiner*—Robert E. Nappi
*Assistant Examiner*—Rita Leykin
*Attorney, Agent, or Firm*—Antonelli, Terry, Stout & Kraus, LLP

[57] ABSTRACT

A high-efficiency, compact and low-cost electric power storage air-conditioning system incorporates inside its air-conditioner an electric power storage unit including a battery which is electrically interconnected to a d.c. system of the air-conditioner. Charging of the battery is controlled to be executed only during a steady operation of the air-conditioner when its load is light. Since a d.c. voltage of the battery is used directly as a d.c. voltage to drive the air-conditioner, a high efficiency, minimized loss and economical operation conditioning system is achieved.

10 Claims, 8 Drawing Sheets

ELECTRIC POWER STORAGE AIR-CONDITIONING SYSTEM

BACKGROUND OF THE INVENTION

The present invention relates to an air-conditioning system, and in particular, it relates to an electric power storage air-conditioning system which is able to store surplus electric power during the night-time, when the electric power demand is low, and to use the stored electric power during the day-time, when the electric power demand is high.

Recently, the electric power consumption at the peak-time during day-time use in the summer season has increased enormously, sometimes causing an insufficiency in the available power supply. As one of the countermeasures to cope with such an insufficiency in the power supply, a solar power generation system for generating electric power using solar energy during day-time use has been proposed and development of such systems is in progress. Further, a home-appliance electric power storage system which is capable of storing surplus electric power in a battery during the night-time and retrieving the stored electric power from the battery during the peak-time of the day has been contemplated.

Although, during the peak-time of the day the electric power demand may not be satisfied due to a shortage of the power supply, during the night-time there is surplus of electric power, since most of the factories consuming electric power are not operating at that time. The main cause for the shortage of electric power during the peak-time of the day is caused by the abundance of home-use air-conditioners. As a countermeasure to such a problem, an electric power storage air-conditioner has been proposed, as described in JPA Laid-open No.6-137650. This prior art air-conditioner has a battery and an arrangement for charging its battery from the a.c. side via a control circuit dedicated to the battery and for supplying d.c. power from the battery to the inverter of the air-conditioner.

In the case of a solar power generation system for operating the air-conditioner, a d.c. voltage generated or stored in the battery first must be inverted to an a.c. voltage and then converted to d.c. within the air-conditioner for driving the motor. Therefore, it is inevitable for the system efficiency to decrease substantially.

In the case of a home-use electric power storage system, in the same manner as described above, the d.c. voltage stored in the battery first must be inverted to an a.c. voltage and then converted to a direct current within the air-conditioner for driving the motor. Thus, a drop in the system efficiency cannot be avoided, similar to the above case.

In addition, for the electric power storage air-conditioner disclosed in JPA Laid-Open No.6-137650, a charging control circuit is required which is dedicated for controlling the charging of the battery. This charging control circuit further requires, in addition to a rectifying and smoothing circuit, provision of an active filter circuit for eliminating harmonic currents involved in its a.c. input, which is noted as a problem to be solved. Thereby, as a result of provision of such circuits, the system configuration becomes complicated, large-sized and costly.

SUMMARY OF THE INVENTION

The main object of the present invention is to solve the above-mentioned problems associated with the prior art and to provide a new electric power storage air-conditioning system which features a high efficiency, compact size and reduced cost.

In order to accomplish the object of the invention, it is contemplated to incorporate an electric power storage unit into the air-conditioner itself, and to connect it with a d.c. system within the air-conditioner. Thereby, the rectifying and smoothing circuit, active filter circuit and voltage control circuit of the air-conditioner itself can be utilized in common also for achieving the object of the invention, i.e. to provide a power storage air-conditioner having a simple structure, compact size and reduced cost. Further, since a battery voltage is used directly to operate the air-conditioner, a substantial improvement in its efficiency can be attained, in addition to having solved the problems associated with the prior art.

Simply, according to the system configuration described above, however, there occurs a problem in that the operation of the air-conditioner is restricted during charging of the battery. To solve this problem, it is contemplated to control charging of the battery so that charging is carried out only when the load on the air-conditioner is light or during a steady operation of the air-conditioner. Namely, charging of the battery is avoided during a start-up of the air-conditioner, which requires full power operation due to the presence of a large temperature difference between its target temperature and the actual room temperature, and the charging of the battery is allowed during a steady operation of the air-conditioner, when the load thereon is small and when the difference between the target temperature and the actual room temperature is small. The load on the air-conditioner can be determined from the motor current, inverter current, its input current or the like.

BRIEF DESCRIPTION OF THE DRAWINGS

The features of the invention will be more clearly understood with reference to the accompanying drawings, wherein.

DETAILED DESCRIPTION OF THE EMBODIMENTS

Figure 1:
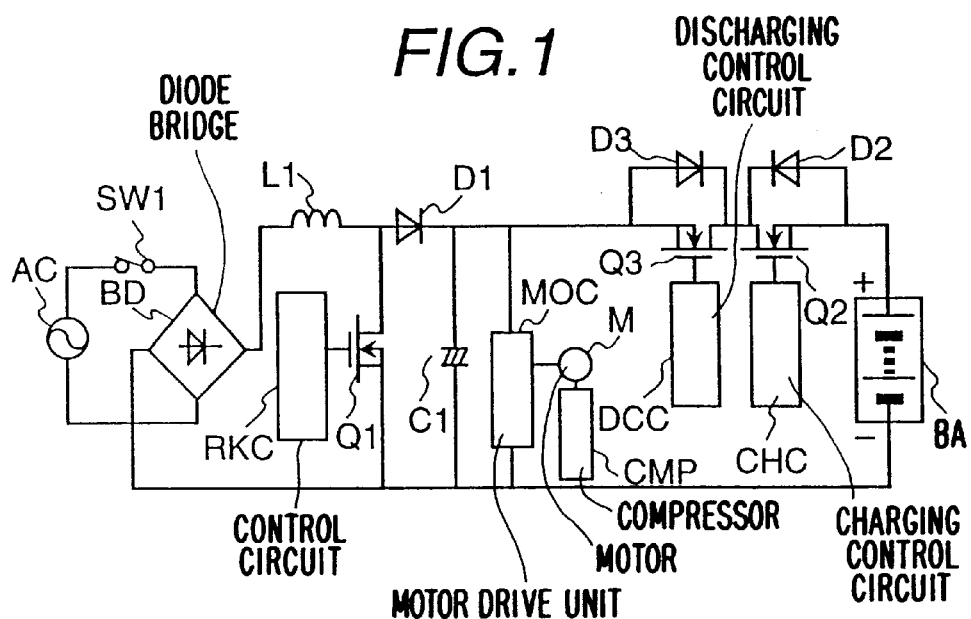
FIG. 1 is a schematic circuit diagram indicative of an electric power storage system representing a first embodiment of the invention.

With reference to FIG. 1, an electric power storage system according to one embodiment of the invention is illustrated. Symbol AC represents an a.c. commercial power supply, and SW1 depicts a switch. BD depicts a rectifying diode bridge which rectifies the a.c. commercial power from the supply AC. L1 denotes a coil, Q1 denotes a switching element, and D1 denotes a diode, and these elements constitute, in conjunction with a control circuit RKC, a power factor improvement circuit (to cope with harmonics in the commercial power supply). The power factor improvement circuit controls switching element Q1 to cause it to turn on and off such that, when turned on, it allows a rectified voltage of the diode bridge BD, which is applied to Q1 via coil L, to be shorted therethrough, and when turned off, allows the stored energy in coil L1 to be discharged, thereby forming the a.c. current from the commercial power supply AC into a sinusoidal waveform. C1 depicts a smoothing capacitor across which a d.c. voltage is obtained.

A left side portion in FIG. 1, including the rectifying block for rectifying the a.c. commercial power supply AC and the capacitor for obtaining a d.c. voltage as described above, will be referred to as a converter unit hereinafter. MOC depicts a motor drive unit, which drives a motor M which actuates a compressor CMP of the air-conditioner. These units described above constitute the arrangement of the air-conditioning system, wherein commercial power from supply AC, after having been rectified in diode bridge BD, is stored in capacitor C1 via the power factor improvement circuit.

Normally, an air-conditioner is designed to have its peak power consumption at its starting period ranging from 15 to 20 minutes, during which the temperature difference between a target temperature and the room temperature is greatest, and afterward when the temperature difference from the target temperature becomes small, it operates at a smaller power consumption with a reduced motor speed of the air-conditioner. Although it depends on individual air-conditioners, according to our estimation, the load on the air-conditioners is substantially reduced when the difference between the target temperature and the actual room temperature resides within 3 to 5° C. Thereby, in the case of charging the battery system with surplus electric power during the night-time, since the air-conditioner will operate at a maximum capacity for 15 to 20 minutes every time after its starting, it is preferable to reduce the charging current during the start up period, or interrupt the charging until its inverter current for driving the motor of the air-conditioner becomes small, after which it is allowed to increase its charging current or restart charging. Namely, the charging current for charging the battery is controlled depending on the difference between the capacity of the converter of the air-conditioner and its load current. Although it varies depending on each air-conditioner, according to our estimation, it becomes possible to start the charging of the battery when the ratio of the capacity of the air-conditioner's converter to a load current becomes 2:1 or greater. Under such a condition, a reliable and safe charging of the battery can be performed without exceeding the capacity of the converter of the air-conditioner.

Now, a rechargeable secondary battery system according to the invention will be described. The secondary battery system of the invention is comprised of a set of battery cells BA having a plurality of lithium ion secondary cells; a charging semiconductor element Q2 connected in series with the battery cells BA; a diode D2; a discharging semiconductor element Q3; a diode D3; a charging control circuit CHC; and a discharging control circuit DCC. During charging of the battery set, charging control circuit CHC operates charging semiconductor element Q2 to turn on and off so as to control its charging current and voltage suitable for charging, and during discharging of the battery set, discharging control circuit DCC operates discharging semiconductor element Q3 to turn on and off so as to control its discharging current and voltage suitable for discharging. By way of example, when MOSFETs are used as the charging and discharging semiconductor elements Q2 and Q3, diodes D2 and D3 can be provided as built-in parasitic diodes. The voltage across the battery set BA is approximately equal to a d.c. voltage obtained by rectifying and smoothing the commercial power supply AC, but is set preferably at a smaller voltage than the above d.c. voltage.

In the arrangement described above, when switch SW1 connected to the commercial power supply AC is on, the voltage across capacitor C1 is at a d.c. voltage level which is obtained by rectifying and smoothing the commercial power of the supply AC. When it is confirmed by a built-in timer provided inside the charging control circuit CHC that it is the night-time, and when the battery set BA is in a discharged state and its voltage is below a chargeable voltage VCU, and further when a current flowing through motor drive unit MOC is small compared to the current capacity of the converter unit, charging control circuit CHC starts charging the battery set by causing charging semiconductor element Q2 to turn on and off at a duty ratio such that its charging current becomes equal to a charging reference current ICS or below and its charging voltage becomes equal to a chargeable voltage VCU. When the voltage of battery set BA becomes higher than the chargeable voltage VCU, the charging of the battery is stopped. Further, when it is determined using a built-in timer inside charging control circuit CHC that it is the daytime, the charging of the battery is not performed, allowing only the air-conditioner to be operated.

When switch SW1 connected to the commercial power supply AC is off, the d.c. voltage across capacitor C1 drops, since no voltage is supplied from commercial power source AC. In this state, the discharge control circuit DCC initiates its control to allow discharging via diode D2 from the battery set by causing discharging semiconductor element Q3 to turn on and off, thereby controlling its discharging current and voltage in a suitable manner. When a voltage across the battery set BA drops below the dischargeable voltage VDL, the discharge operation is stopped. Further, the discharge current is controlled so as not to exceed an allowable maximum discharge current IDM.

According to the invention, as stated above, since the d.c. of the battery can be applied directly to the air-conditioner, a high efficiency of operation can be attained at a minimized loss and economically. Further, its system configuration is simple, compact in size and less costly. Still further, a new air-conditioning system can be provided which is readily capable of leveling off the peak power demand. Still further, the air-conditioner unit of the electric power storage air-conditioner system of the invention is of a conventional type, and so it is easy to retrofit conventional air-conditioners with this battery system.

By way of example, the peak time of the electric power demand in the summer season resides between noon and three o'clock, and during the night hours there in an abundance of surplus electric power. Thereby, it is advantageous and efficient to use the surplus electric power available during night-hours to charge the battery, and to use the stored electric power during the peak time from noon to three o'clock.

Figure 2:
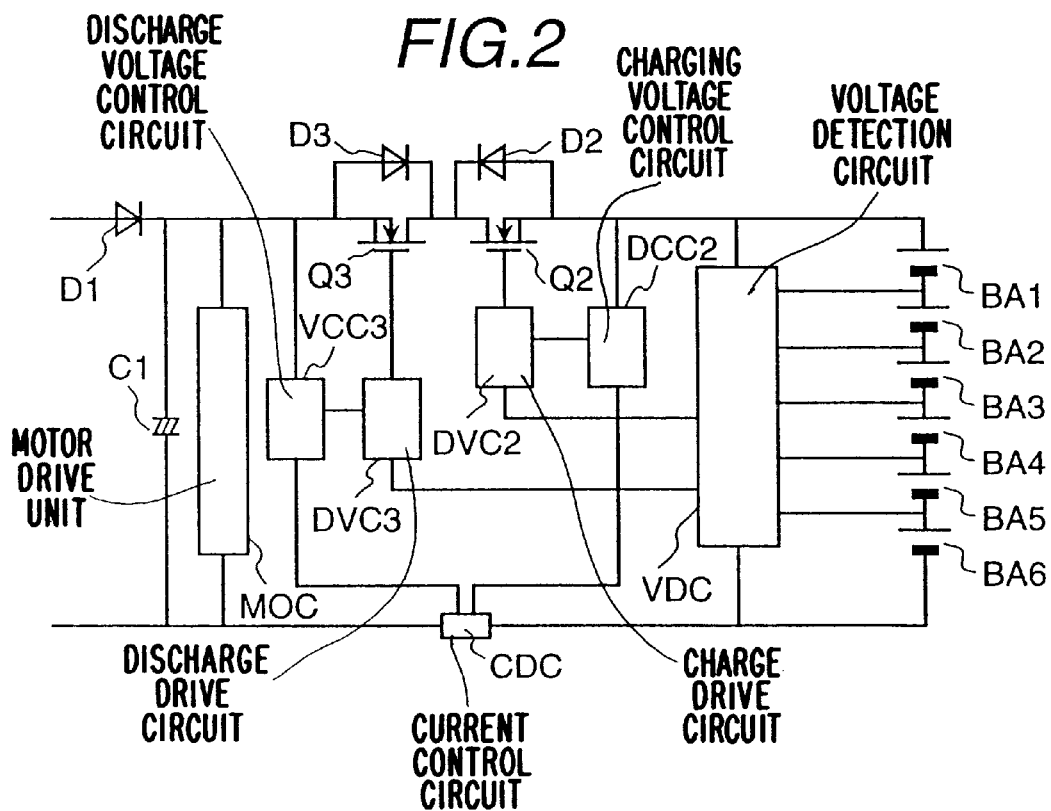
FIG. 2 is a schematic block diagram indicative of a secondary battery system of the first embodiment of the invention.

With reference to FIG. 2, a block diagram of a secondary battery system according to one embodiment of the invention is depicted. In this example, a battery set BA is comprised of 6 lithium ion battery cells. The lithium ion battery which can store a high density of energy per volume and thus is suitable for use in a compact system, however, has drawbacks in that it is less resistant to over-voltage, overcharging and excess discharging of the battery cells, and thereby it is easily subject to overheating or igniting. Thereby, it becomes necessary to provide for a monitoring system to monitor the voltage level at each battery cell. In FIG. 2, the air-conditioning unit is omitted to simplify the drawing, and diode D1, capacitor C1 and motor drive unit MOC are the same elements as shown in FIG. 1. Also, charging semiconductor element Q2 and discharging semiconductor element Q3 are the same as those of FIG. 1.

Battery cells BA1 to BA6 are interconnected in series, and the respective voltages thereof are input from respective interconnections therebetween to a voltage detection circuit VDC. Voltage detection circuit VDC detects the voltage level of each battery cell, and if its voltage becomes higher than the allowable maximum voltage MXV or smaller than the allowable minimum voltage MIV, it controls the charging voltage control circuit DCC2 or discharge voltage control circuit VCC3 to cut off the output, thereby preventing the battery from being overcharged or over-discharged. Voltage detection circuit VDC is normally in the on-state, thereby charge drive circuit DVC2 and discharge drive circuit DVC3 are in a state ready to operate. Charging voltage control circuit DCC2 controls charge drive circuit DVC2 such that the battery voltage is maintained constant.

A current control circuit CDC controls charging voltage control circuit DCC2 and discharging voltage control circuit VCC3 such that the charging current will not exceed a specified charging reference current ICS. Thus, it should be noted that current control has a priority over voltage control. If it is confirmed that it is the night-time, that the battery set BA is in discharged state and its voltage is below the chargeable voltage VCU, and that the current of motor drive unit MOC is small relative to the current capacity of the converter, then charging voltage control circuit DCC2 produces a command signal to charge drive circuit DVC2 to start charging, and current control circuit CDC controls charging voltage control circuit DCC2 such that its charging current will not exceed the charging reference current ICS. Thereby, when the battery voltage is lower than the chargeable voltage VCU, the battery is charged with charge reference current ICS, and when the battery voltage reaches the chargeable voltage VCU, the battery is charged at a constant voltage.

Next, in the day-time, when switch SW1 connected to the commercial power source is turned off due to excessive demand in the electric power system, and when the voltage of capacitor C1 drops below the reference voltage SVD3 of the discharge control circuit DCC, the discharge control circuit DCC is activated to operate discharge drive circuit DVC3, which, by turning the discharging semiconductor element Q3 on and off, starts the discharging from the battery by controlling its discharge current and voltage. Discharge voltage control circuit VCC3 is controlled such that its discharge current will not increase to a level when it is greater than the allowable maximum discharge current IDM.

Figure 3:
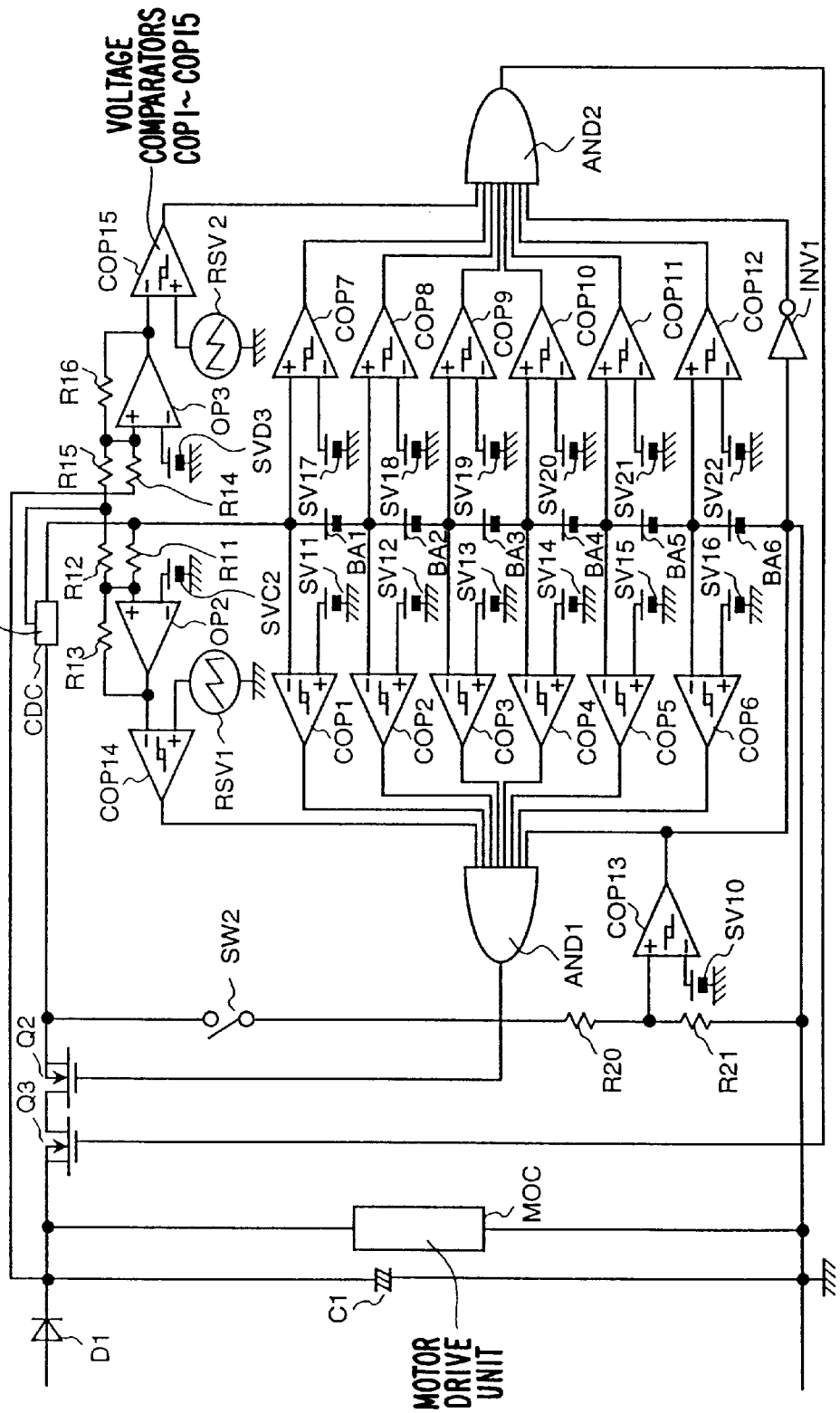
FIG. 3 is a schematic circuit diagram of the secondary battery system of the first embodiment of the invention.

FIG. 3 is a schematic circuit diagram of a secondary battery system embodying the invention. A battery set BA is comprised, by way of example, of 6 lithium ion battery cells. Diode D1, capacitor C1 and motor drive unit MOC, which constitute the air-conditioner, are the same elements as those indicated in FIG. 1. Charging semiconductor element Q2 and discharging semiconductor element Q3 also are the same components as in FIG. 1. Respective battery cells from BA1 to BA6 are connected in series. Each battery cell BA1 to BA6 is interconnected and its voltage is input to one of the voltage comparators COP1 to COP12, respectively. Each voltage comparator COP1 to COP12 has another input terminal which is connected to a respective reference voltage SV11 to SV22. Voltage comparators COP1–COP6 and reference voltages SV11–SV16 of these two groups are arranged such that the voltage level at each battery cell during charging is compared with the maximum allowable voltage MXV, so that, when the voltage level at any battery cell exceeds the maximum allowable voltage MXV, it is certain to be detected.

Outputs from voltage comparators COP1–COP6 are input to logical add circuit AND1. Outputs from voltage comparators COP13 and COP14 are also supplied to logical add circuit AND1, whereby the output of voltage comparator COP14, which is an output for controlling the charging voltage, is controlled. Namely, when the voltage level of any one of the battery cells exceeds the maximum allowable voltage MXV during charging, the output for controlling the charging voltage is cut off by turning off the input to the charging semiconductor element Q2, thereby disconnecting the charging circuit to protect the battery cells from being overcharged, which provides improved safety of operation.

Further, the voltage comparators COP7–COP12 and reference voltages SV17–SV22 of these two groups are arranged such that each voltage level during discharge of each battery cell is compared with the minimum allowable voltage MIV, thereby detecting when each voltage of any battery cell drops to the minimum allowable voltage MIV. An output from each voltage comparator COP7–COP12 is input to logical add circuit AND2. Logical add circuit AND2 also receives outputs from voltage comparator COP15 and inverter INV1, thereby controlling an output from voltage comparator COP15, which is an output for controlling the discharging voltage. That is, when a voltage of any one of the battery cells falls below the minimum allowable voltage MIV during discharge, the output for controlling the discharging voltage is cut off, cutting off the input to discharging semiconductor element Q3, and thus interrupting the discharge circuit so that the battery cells are protected from being over-discharged which provides improved safety of operation.

Now, charging voltage control and charging current control will be described in the following. A voltage at the terminal of the battery set BA is input to an operational amplifier OP2 at its plus input terminal, and a chargeable voltage VCU which allows charging is input at its minus input terminal, wherein the two input voltages are compared and the difference therebetween is output as an error voltage. The output from operational amplifier OP2 is input to a minus input terminal of voltage comparator COP14, to a plus input terminal of which is input a high frequency saw-tooth wave RSV1. When the charging voltage becomes higher than the chargeable voltage VCU, the output voltage from the operational amplifier OP2 becomes high, which output voltage is then compared with the saw-tooth wave RSV1 in voltage comparator 14, whereby an output from voltage comparator 14 which is formed as a result of comparison becomes a square-wave having a shortened on-period, thus effecting a control to shorten the on-period of the charging semiconductor element Q2 so that the charging voltage will not increase excessively.

Operational amplifier OP2 also receives an input at its plus input terminal from current detection circuit CDC via a resistance R12. The value of input resistance R12 to the operational amplifier OP2 is set to be smaller than the value of a resistance R11 for voltage control, such that the amplification factor of the current control becomes higher. By provision of such an arrangement, the current control becomes dominant, placing priority on the current control. When the value of the charging current becomes higher than a reference charging value which is preset in the current detection circuit CDC, the output from OP2 increases, and voltage comparator COP14 produces, as a result of the comparison, a square-wave having a shortened on-period, thus shortening the on-period of the charging semiconductor element Q2 and thereby preventing the charging current from increasing.

Now, the discharging voltage control and discharging current control will be described. When the terminal voltage across capacitor C1 drops, a discharge mode is initiated to effect a discharge from the set of battery cells. The terminal voltage of capacitor C1 is input to a plus input terminal of an operational amplifier OP3, and to a minus input terminal of amplifier OP3 is input a reference voltage SV3. The two input voltages are compared, and the difference therebetween is output as an error voltage. An output from operational amplifier OP3 is input to a minus input terminal of voltage comparator COP15, and to a plus input terminal of COP15 is input a high frequency saw-tooth waveform RSV2. When the discharge voltage becomes higher than reference voltage SV3, the output voltage from operational amplifier OP3 becomes higher, which is compared with saw-tooth wave RSV2 in OP3 operational amplifier, whereby an output from amplifier OP3 becomes a square-wave having a shortened on-period waveform as a result of comparison, and thereby the terminal voltage of capacitor C1 is controlled so as not to increase, since the on-period of the discharge semiconductor element Q3 is shortened.

Operational amplifier OP3 is also is supplied at its plus input terminal with an input from current detection circuit CDC via a resistance R15. Here, the value of input resistance R15 is set to be smaller than the resistance R14 for voltage control, thereby increasing the amplification factor of the current control over the voltage control. By this arrangement, the current control becomes dominant, thereby executing the current control in preference to voltage control. When the value of discharge current exceeds a discharge reference value stored in current detection circuit CDC, the output from operational amplifier OP3 becomes high, thereby causing voltage comparator COP15 to produce a square-wave having a shortened on-period as a result of comparison between the output from OP3 and saw-tooth waveform RSV2, so that its discharge current is controlled so as not to increase, since the on-period of the discharge semiconductor element Q3 is shortened accordingly.

Figure 4:
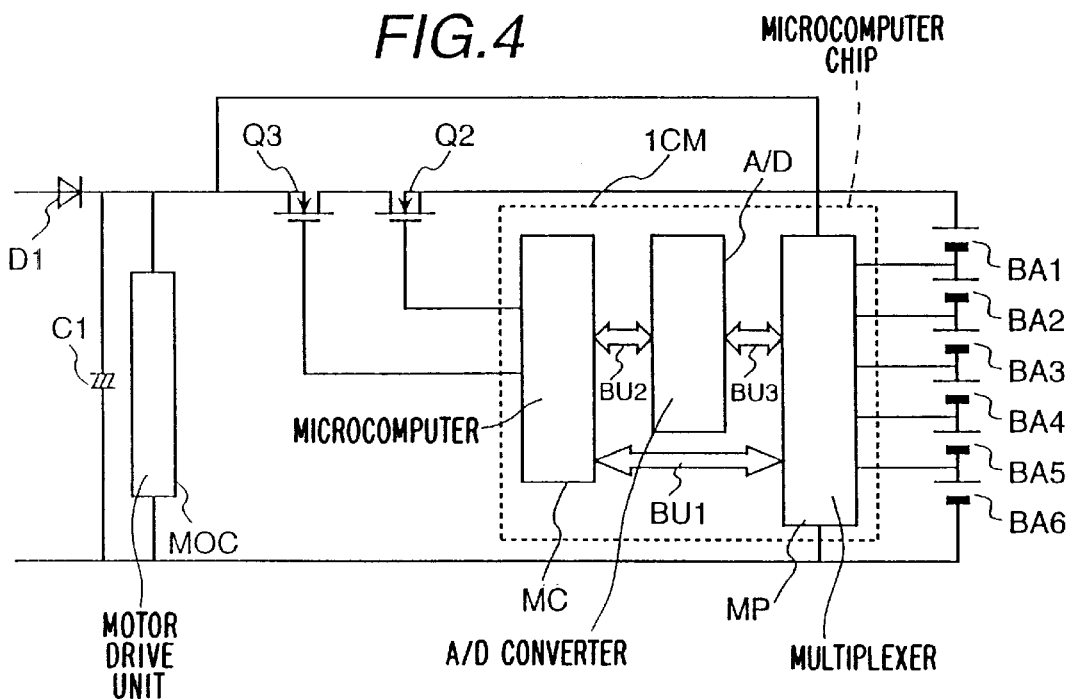
FIG. 4 is a schematic block diagram indicative of a second embodiment of the invention.

A schematic block diagram of another embodiment of the invention is indicated in FIG. 4. The air-conditioner body is omitted from FIG. 4 for ease of illustration. Diode D1, capacitor C1 and motor drive MOC, which constitute an air-conditioner control unit, are the same as in FIG. 1. This embodiment of the invention represents an example which utilizes a micro-computer for its control. 1CM depicts a one-chip microcomputer, which includes a multiplexer MP, an A/D converter (analog-to-digital converter) and a microcomputer MC, which are interconnected by buses BU1–BU3. Respective battery cells BA1–BA6 are connected in series, and respective interconnection nodes between respective battery cells are connected to respective input terminals of multiplexer MP. The terminal voltage across capacitor C1 is input also to multiplexer MP. Outputs from microcomputer MC are connected to the gates of the charging semiconductor element Q2 and discharging semiconductor element Q3, respectively.

Figure 5:
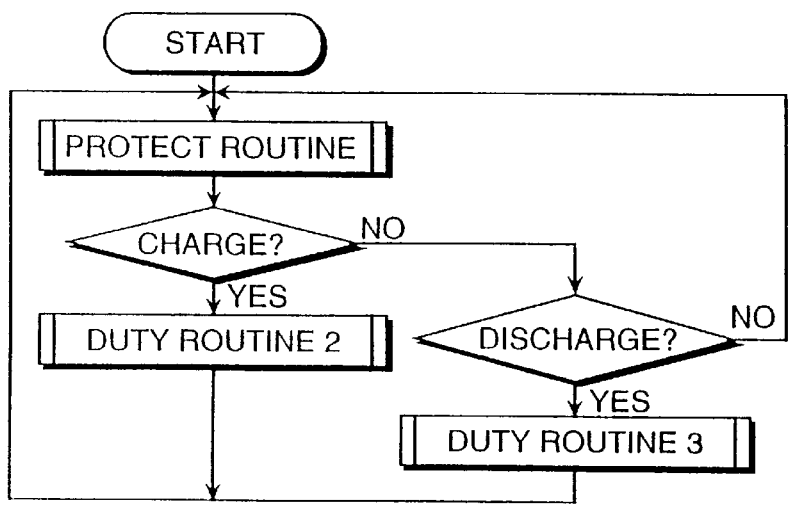
FIG. 5 is a flowchart of operation of the second embodiment of the invention.

The operation of this embodiment of the invention, having the above-mentioned configuration, will be described with reference to the flowchart of FIG. 5. When started, the process enters into a protect routine where a protection-associated processing is executed. Then, it is determined whether or not there exists a charge command. If not, it is further determined whether or not there exists a discharge command. If neither command exists, the process returns to the start to repeat the same flow. If a charge command is detected, the step enters into a duty routine 2, whereby the charge process is executed, and then the process returns to the start. Further, when a discharge command is detected, the process enters into a duty routine 3, whereby the discharge process is executed, and then the process returns to the start.

Figure 6:
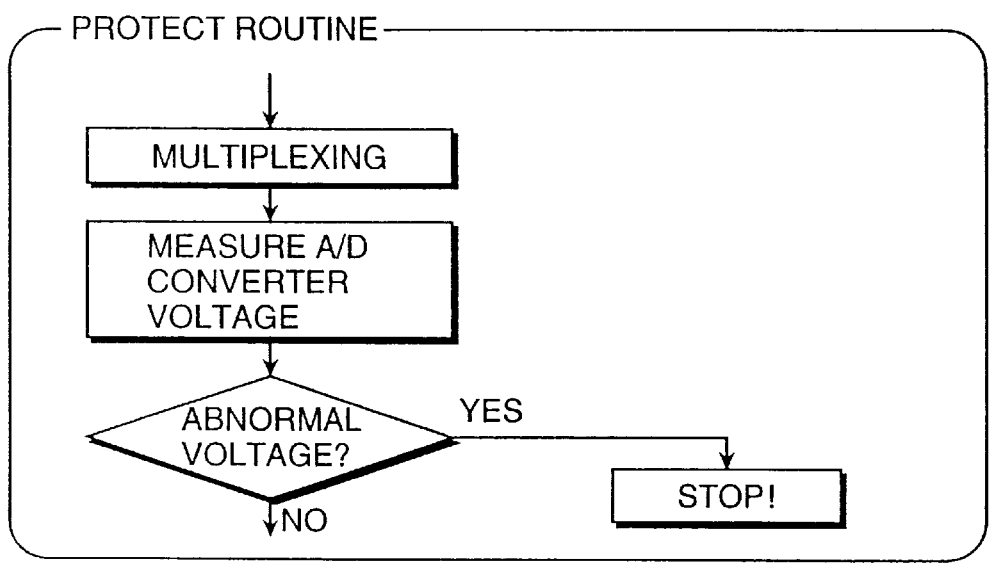
FIG. 6 is a flowchart of operation of a protection part in the second embodiment of the invention.

The protect routine will be described more in detail with reference to the flowchart of FIG. 6. First of all, the voltage level of each battery cell, which is obtainable by switching multiplexer MP, is measured in A/D converter A/D. In this regard, it is determined whether each measured voltage level resides between the maximum allowable voltage and the minimum allowable voltage, and if it exists therebetween, no abnormality is judged to exist. Thus, the process exits this routine. If any voltage level does not fall between the maximum and minimum allowable voltages, thus suggesting the presence of an abnormality, the charging or discharging operation is stopped.

Figure 7:
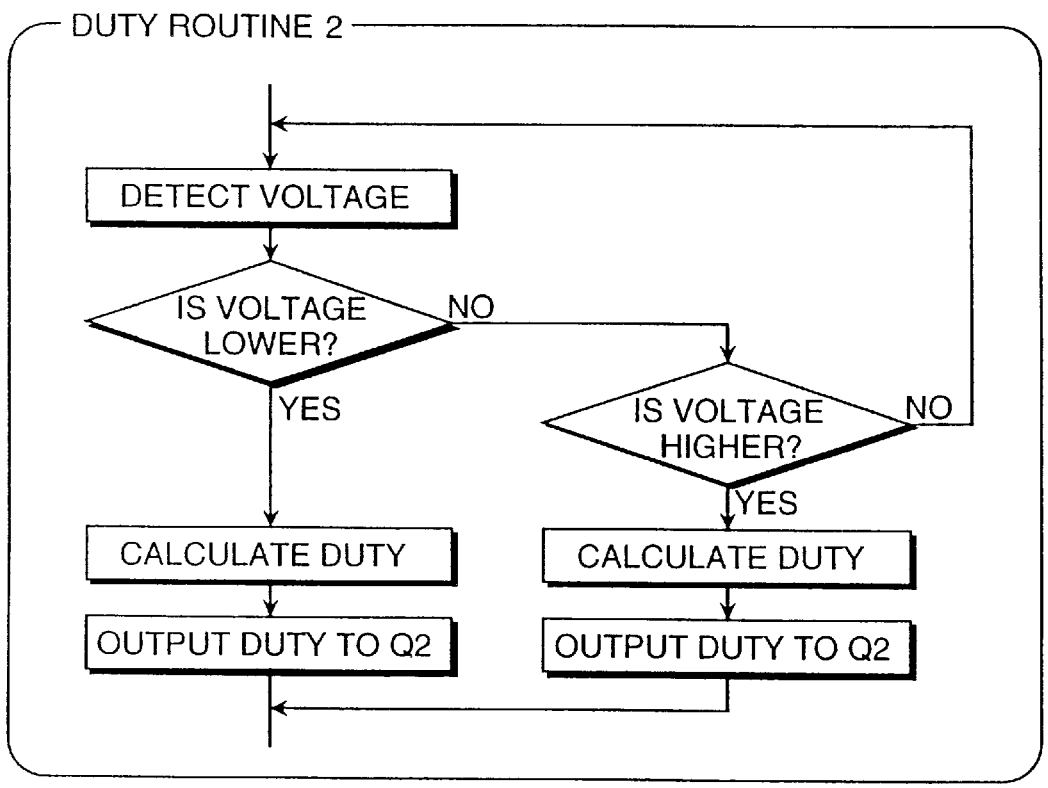
FIG. 7 is a flowchart of charging in the second embodiment of the invention.
Figure 8:
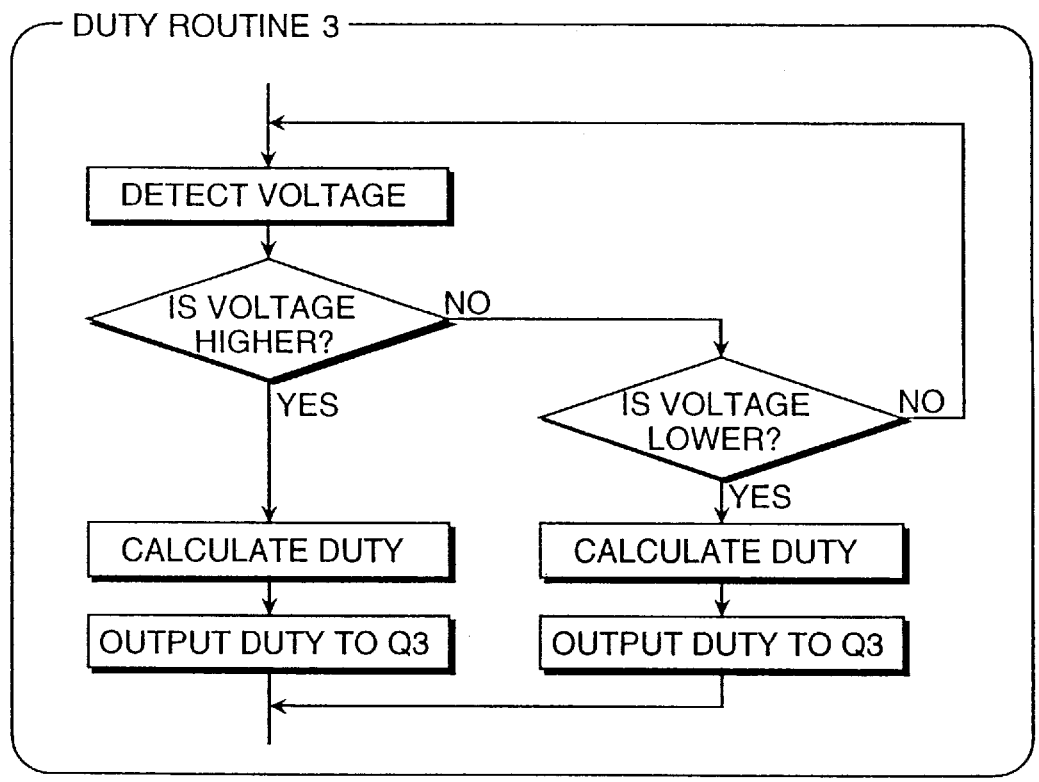
FIG. 8 is a flowchart of discharging in the second embodiment of the invention.

Now, duty routines 2 and 3 will be described more specifically with reference to the flowcharts of FIGS. 7 and 8. In duty routine 2 of FIG. 7, a charge reference current ICS is set on the basis of a load current iL detected in the motor drive MOC and the specified current capacity of the converter. Each voltage level of the battery set BA selectively switched by the multiplexer MP is measured by A/D converter A/D, and it is determined whether or not the measured voltage is lower than the chargeable voltage VCU at which charging is allowed. If it is lower, then it is determined whether the charging current is higher than the charging reference current ICS. If the charging current is higher, then, an on-off duty of the output thereof is calculated according to a difference between the charging current and charging reference current ICS so as to reduce the duty, thereby outputting a reduced duty to the gate of charging semiconductor element Q2. As a result, the charging current is caused to decrease and approach a target value corresponding to the charging reference current ICS. When the charging current is determined to be not higher than the charging reference current ICS, then it is determined whether or not the charging current is lower than charging reference current ICS. If it is not lower, it is allowed to pass therethrough as it is, and if it is lower, its duty is increased and an increased duty is output to the gate of the charging semiconductor element Q2. Further, when the detected voltage is not lower than the chargeable voltage VCU, then it is judged whether or not the voltage is substantially higher than chargeable voltage VCU. If it is not substantially higher, the voltage is allowed to pass through as it is, and if the voltage is higher, an on-off duty of the output is calculated according to a difference between its voltage and the chargeable voltage VCU so as to reduce the duty, and a reduced duty is output to the gate of the charging semiconductor element Q2. As a result, the charging voltage is decreased to approach the chargeable voltage VCU as a target value.

In duty routine 3, the discharge current of the battery is measured, and it is judged whether or not its discharge current is smaller than allowable discharge current IDM. If it is not smaller, its duty is caused to decrease substantially, and a substantially reduced duty is output to the gate of discharging semiconductor element Q3 so that the discharge current becomes equal to or smaller than the allowable discharge current IDM. Alternatively, if it is smaller than IDM, the terminal voltage of capacitor C1 is measured by A/D converter A/D through switching of the multiplexer MP, and then it is judged whether or not its measured voltage is higher than the reference voltage SV3. If it is higher, its on-off duty is reduced according to a difference between the measured voltage and reference voltage SV3, and this reduced duty is output to the gate of the discharge semiconductor element Q3. As a result, the terminal voltage of capacitor C1 decreases to approach the reference voltage SV3 as a target value. If the measured voltage is not higher than SV3, then it is judged whether or not the voltage is lower than the reference voltage SV3. If it is not lower, the voltage is allowed to pass through as it is. If the measured voltage is judged to be lower than the reference voltage SV3, its on-off duty is increased according to a difference between the measured voltage and the discharge reference voltage SV3, and this increased duty is output to the gate of the discharge semiconductor element Q3. As a result, the terminal voltage of capacitor C1 increases to approach a target value which corresponds to reference voltage SV3.

Figure 9:
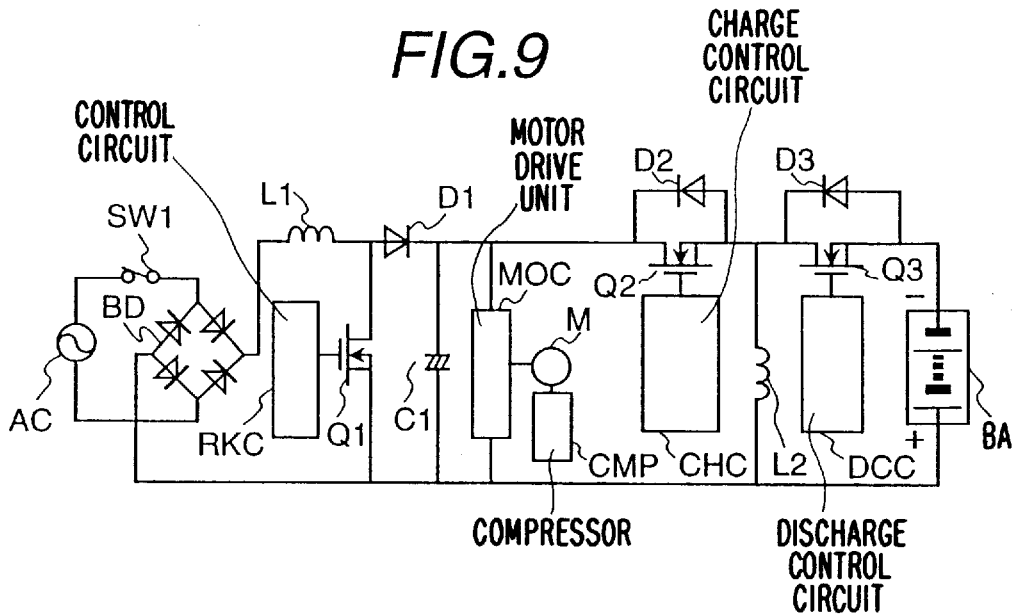
FIG. 9 is a schematic circuit diagram of an electric power storage system of a third embodiment of the invention.

With reference to FIG. 9, an electric power storage system according to still another embodiment of the invention is indicated. The same reference symbols as in FIG. 1 depict the same components which perform the same functions. In FIG. 9, motor drive unit MoC drives a motor M which is a brushless motor. A feature of this embodiment of the invention which is distinct from that of FIG. 1 resides in the fact that a built-in step-up chopper is provided in the secondary battery system. Thereby, the system is arranged such that its charge control circuit CHC, the charging semiconductor element Q2 and the diode D2 are disposed to the side of an air-conditioner, battery cells BA are interconnected in reversed polarity, and a coil L2 is connected to the battery cells BA via a discharge control circuit DCC, discharge semiconductor element Q3 and diode D3.

According to this embodiment of the invention, it becomes possible to construct a system which can coordinate charging and discharging even if there exists a difference between the terminal voltage across capacitor C1, which is obtained by rectifying and smoothing the commercial power of supply AC, and a voltage of the battery cell set BA. In particular, since control of a lithium ion battery is difficult when the number of cells connected in series is increased, it would be advantageous to construct a simple system which has the above-mentioned configuration with a smaller number of lithium cells connected in series.

In the case of battery charging, the charging semiconductor element Q2 is turned on to allow a current from the commercial power supply AC to flow therethrough to coil L2 to store energy therein. Then, upon turning off the charging semiconductor element Q2, the energy stored in coil L2 is caused to flow through diode D3 to charge the battery. A charging voltage in this case is determined by the on-off duty of the charging semiconductor element Q2. In particular, when its duty is smaller than 50%, its voltage is stepped down, and when its duty is larger than 50%, its voltage is stepped up. Therefore, when the battery voltage is set at a low voltage, it is used at less than 50% of duty.

Further, in the case of battery discharge, the discharge semiconductor element Q3 is turned on to cause a current to flow from battery cell set BA to the coil L2 to store energy therein. Then, when the discharge semiconductor element Q3 is turned off, the energy stored in coil L2 is caused to flow through diode D2 to charge capacitor C1. Since this charge voltage at this instant is determined by the on-off duty of the discharge semiconductor element Q3, when the battery voltage is set low, it is used at 50% or greater of duty.

Figure 10:
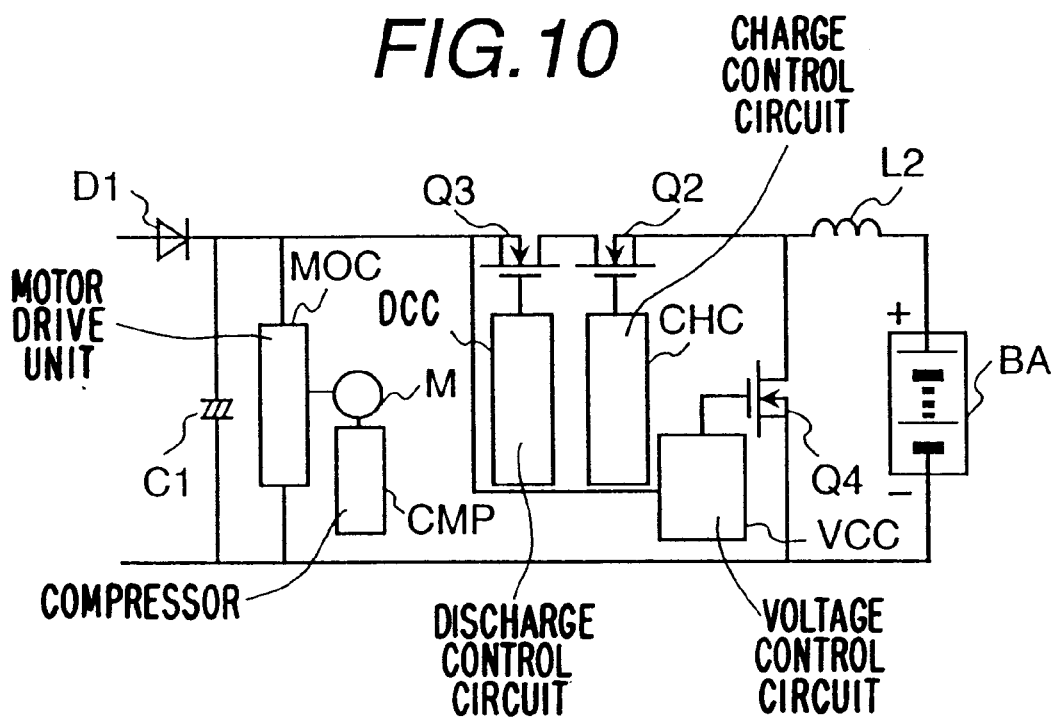
FIG. 10 is a schematic circuit diagram indicative of an electric power storage system of the third embodiment of the invention.

FIG. 10 is an electric power storage system according to a still further embodiment of the invention. The same reference symbols as in FIG. 1 depict the same components which perform the same functions. In FIG. 10, motor drive unit MOC is provided to drive a motor M which is a brushless motor. A feature of this embodiment distinct from that of FIG. 1 is that a built-in booster chopper is provided in its secondary battery system. This embodiment of the invention represents an example in which its battery cell group BA is utilized at a voltage which is lower than the terminal voltage of the capacitor C1, which is obtained by rectifying and smoothing the commercial power of supply AC. Control during the charging mode is the same as in FIG. 1, however, since the battery voltage is set at a lower voltage, it must be controlled during the discharging mode such that the battery voltage is stepped up to a charging voltage by a coil L2 and a step-up semiconductor element Q4. More specifically, when the step-up semiconductor element Q4 is turned on, the battery set BA is short-circuited, and a current flows through coil L2 thereby storing energy in coil L2. Then, when the step-up semiconductor element Q4 is turned off, the capacitor C1 is charged by a combined voltage which is produced by combining the energy stored in coil L2 and the voltage of the battery set BA. Therefore, the voltage of capacitor C1 becomes higher than the voltage of the battery set BA, and its step-up magnitude is determined by a specified on-off duty of the step-up semiconductor element Q4.

Figure 11:
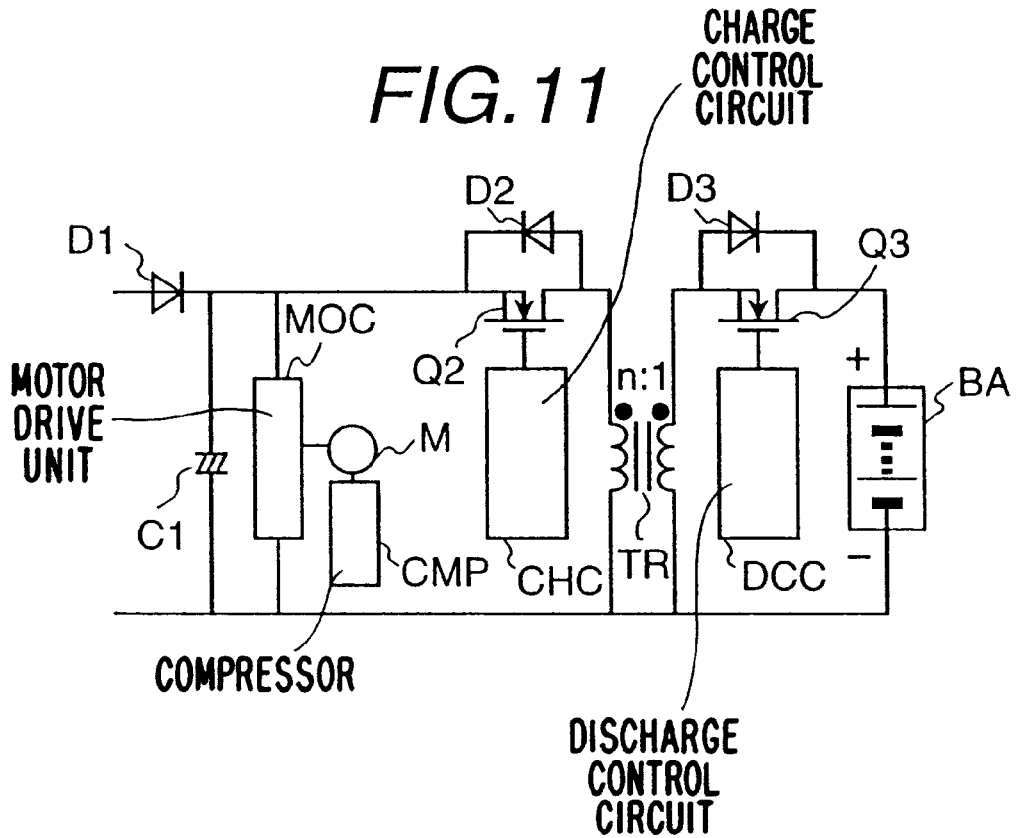
FIG. 11 is a schematic circuit diagram indicative of an electric power storage system of the third embodiment of the invention.

With reference to FIG. 11, still another electric power storage system embodying the invention is indicated. The same reference symbols as in FIG. 1 represent the same components depicted therein which perform the same functions. In the drawing, a motor drive unit MOC is provided to drive a motor M which is a brushless motor. A main difference from the embodiment of FIG. 1 resides in the fact that a built-in transformer TR is provided in the secondary battery system. The advantage of this embodiment of the invention is that it enables provision of an electric power storage system even if there exists a substantial difference between the voltage of its battery set BA and the voltage of its capacitor C1, which is obtained by rectifying and smoothing the commercial power of supply AC.

In the case of battery charging, the charging semiconductor element Q2 is turned on and off, allowing a current from commercial power supply AC to flow through a primary winding of transformer TR, thereby inducing a voltage across a secondary winding of transformer TR. The induced voltage is determined by a ratio in the number of windings between the primary and the secondary coils, and this induced secondary voltage is applied through diode D3 to charge the battery set. In this case, since a chopped d.c. voltage is applied to the transformer TR, a duty smaller than 50% is adopted in order to prevent saturation of the transformer.

Further, in the case of battery discharge, the discharge semiconductor element Q3 is turned on and off, allowing a current from the battery to flow through the secondary winding of transformer TR, thereby inducing a voltage across the primary winding of transformer TR. The induced voltage, which is determined by a ratio in the number of windings between the primary coil and the secondary coil, is applied through diode D2 to charge capacitor C1.

Figure 12:
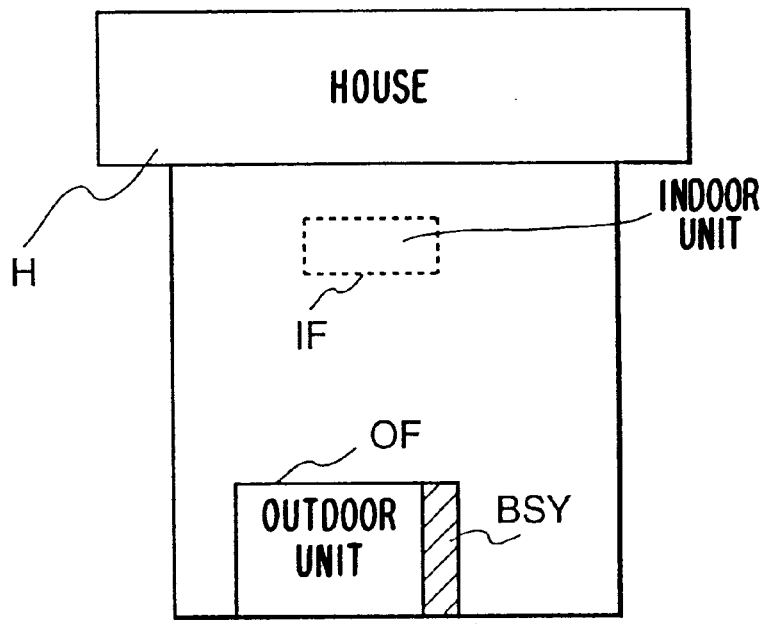
FIG. 12 is a diagram indicative of a layout of the electric power storage system embodiment of the invention.

With reference to FIG. 12, a layout of an electric power storage system embodying the invention is illustrated. Reference symbol H depicts a house. In this example, the system is comprised of an indoor unit IF of an air-conditioner and an outdoor unit OF thereof, and a secondary battery system BSY, which is installed in combination with the outdoor unit OF. This layout is advantageous for securing as much indoor space as possible and for neatly housing the secondary battery system BSY in the outdoor unit OF, thereby giving a streamline appearance.

Figure 13:
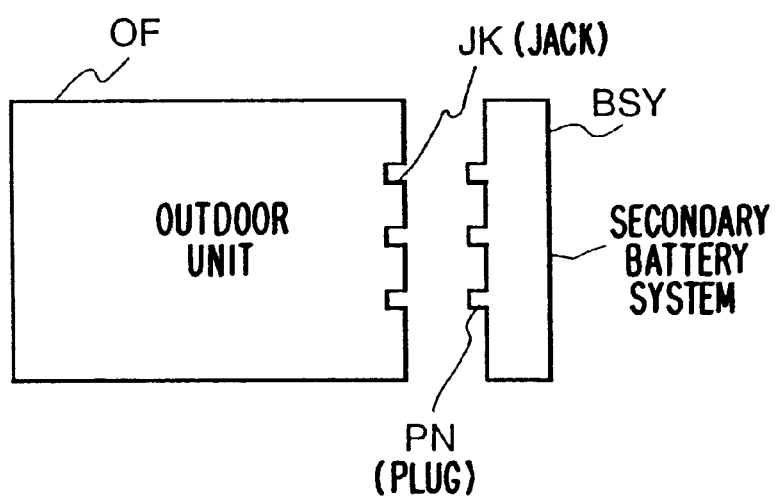
FIG. 13 is a diagram indicative of a connection of the electric power storage system embodying the invention.

FIG. 13 illustrates a connection layout for interconnecting the electric power storage system embodying the invention. More particularly, it illustrates an example of the connection for installing the secondary battery system BSY into the outdoor unit OF of FIG. 12. The secondary battery system BSY and the outdoor unit OF are electrically connected for one-touch connection by means of jack JK, which is provided on the outdoor unit OF, and the plug PN, which is provided on the secondary battery system BSY. Thereby, the secondary battery system BSY can be disconnected easily.

Figure 14:
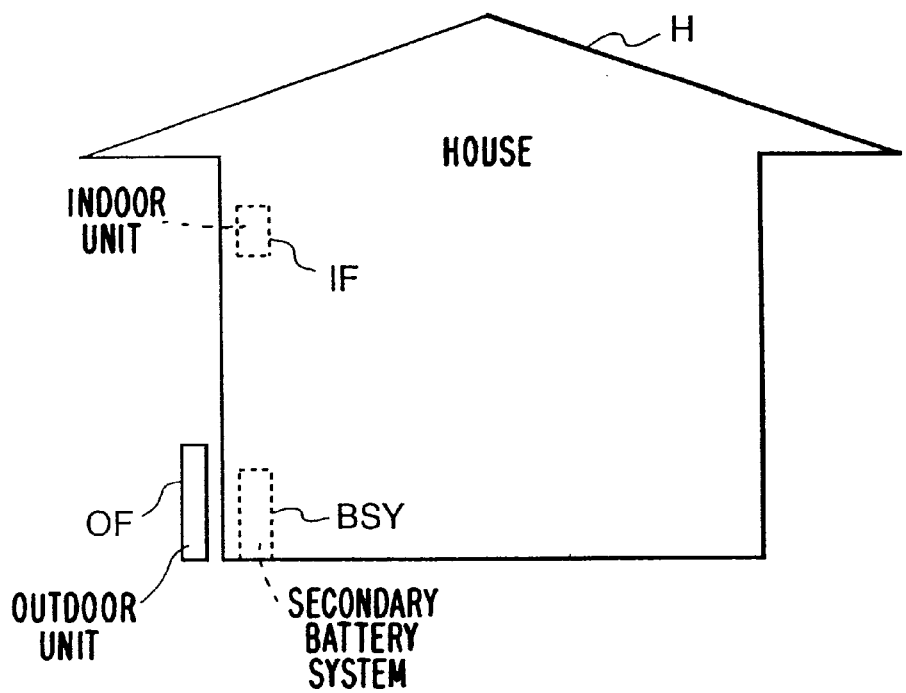
FIG. 14 is a diagram indicative of a layout of an electric power storage system of the invention.

FIG. 14 illustrates another example of a layout of an electric power storage system embodying the invention. In this example, the system is comprised of an indoor unit IF and an outdoor unit OF of an air-conditioner, and a secondary battery system BSY, which is installed indoors, where the change in ambient temperature is small. This is because the performance of the secondary battery system BSY tends to vary greatly depending on changes in ambient temperature. Hence, by installing the BSY indoors where the ambient temperature change is small, the battery performance can be prevented from deteriorating, and the battery life can be prolonged substantially.

Figure 15:
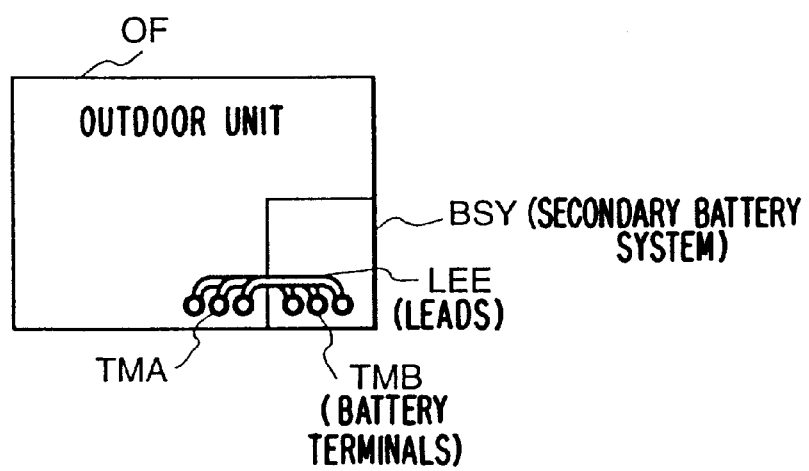
FIG. 15 is a diagram showing the interconnecting of a battery system and an electric power storage system embodying the invention.

FIG. 15 is a diagram depicting an electrical connection between the battery system and the electric power storage system embodying the invention. In particular, the diagram shows an example of an electric connection between the outdoor unit OF and the built-in secondary battery system BSY of FIG. 12, which is provided in the outdoor unit OF. The outdoor unit OF of the air-conditioner is provided with terminals TMB to be coupled with the battery, and the secondary battery system BSY is provided with terminals TMA to be coupled with the air-conditioner, and these terminals are connected removably by lead cables LEE, thereby enabling easy removal of the secondary battery system BSY.

According to the invention as described above, there is an advantage in that a high efficiency, low-loss and economical air-conditioner can be provided, since the d.c. voltage of the battery can be utilized as a d.c. voltage directly to drive the air-conditioner.

Further, there is another advantage in that an air-conditioner can be realized which is simple in construction, compact in size, low in cost of production, and which can contribute to a leveling off of the peak power demands.

Still further, this electric power storage air-conditioner system of the invention can be constructed readily using conventional air-conditioners.

What is claimed is:

1. An electric power storage air-conditioning system having a converter unit for converting a.c. to d.c. and a motor drive unit for driving a motor which actuates a compressor using the d.c., comprising:

a secondary battery system, which is rechargeable and has an electric interconnection between said converter unit for converting a.c. to d.c. and said motor drive unit for driving the motor using the d.c., wherein said secondary battery system includes a battery which is charged by said converter unit for converting a.c. to d.c.; and a charge control unit provided between the battery of said secondary battery system and said converter unit for controlling a charge current for charging said battery to be within a difference between a current capacity of said converter and a load current.

2. An electric power storage air-conditioning system according to claim 1, wherein said system further comprises a DC/DC converter which is interconnected between said converter unit for converting a.c. to d.c. and said secondary battery system.

3. An electric power storage air-conditioning system according to claim 1, which further comprises a step-up coil which is interconnected in series with said secondary battery system, and a switching semiconductor device, whereby said step-up coil is energized to step up an output of the secondary battery system by switching said semiconductor device.

4. An electric power storage air-conditioning system according to claim 3, wherein said secondary battery system comprises charging and discharging semiconductor elements which are connected to the step-up coil which is connected in series with the secondary battery system.

5. An electric power storage air-conditioning system according to claim 1, wherein said secondary battery system comprises: a discharge control semiconductor element and a step-up coil, both connected in series with the battery of said secondary battery system; and a charge control semiconductor element which is connected between said step-up coil and said converter unit for converting a.c. to d.c.

6. An electric power storage air-conditioning system according to claim 1, wherein the battery of said secondary battery system is connected in series with a step-up coil via a discharge control semiconductor element, and said converter unit for converting a.c. to d.c. is connected to said step-up coil via a charging control semiconductor element.

7. An electric power storage air-conditioning system according to claim 1, wherein said secondary battery system comprises: a discharge control semiconductor element connected in series with the battery of said secondary battery system; a transformer having a secondary coil which is connected in series with the discharge control semiconductor element; and a charging control semiconductor element which is connected between a primary coil of the transformer and the converter unit of the air-conditioner for converting a.c. to d.c.

8. An electric power storage air-conditioning system according to claim 1, wherein the battery of said secondary battery system is connected to a secondary coil of a transformer via a discharge control semiconductor element which is connected in series therebetween, and the converter unit of the air-conditioner for converting a.c. to d.c. is connected to a primary coil of the transformer via a charging control semiconductor element.

9. An electric power storage air-conditioning system according to claim 1, wherein the battery of said secondary battery system is comprised of a lithium ion battery.

10. An electric power storage air-conditioning system according to claim 1, wherein said secondary battery system is installed inside an outdoor unit of air-conditioning equipment.

* * * * *